United States Patent [19]

Vanderplow

[11] Patent Number: 4,860,486
[45] Date of Patent: Aug. 29, 1989

[54] KEELED FISHING LURE APPARATUS

[76] Inventor: Allen P. Vanderplow, 5712 Glenwood Dr., Racine, Wis. 53406

[21] Appl. No.: 204,904

[22] Filed: Jun. 10, 1988

[51] Int. Cl.$^4$ .............................................. A01K 85/00
[52] U.S. Cl. .................................. 43/42.19; 43/42.46
[58] Field of Search ................ 43/42.19, 42.22, 42.46, 43/42.47

[56] References Cited

U.S. PATENT DOCUMENTS

| | | | |
|---|---|---|---|
| 2,660,827 | 12/1953 | Pero | 43/42.19 |
| 2,674,823 | 4/1954 | Gellings | 43/42.19 |
| 4,090,319 | 5/1978 | Wolfe | 43/42.19 |
| 4,599,821 | 7/1986 | Martin | 43/42.46 |

Primary Examiner—M. Jordan
Attorney, Agent, or Firm—Peter N. Jansson Ltd.

[57] ABSTRACT

Improved fishing lure apparatus having a keel formed of a wire double back on itself, from the keel distal end, as first and second wire portions which are together at the keel proximal end, the first wire portion extending from the keel proximal end to form a line-attachment loop and terminating in a first end segment returning from the line-attachment loop and wound around the first and second wire portions at the keel proximal end. The second wire portion may extend from the keel proximal end along the principal axis of the lure to form a spindle to which a spinner spoon is rotatably secured. In certain preferred embodiments, the engagement of the spoon with a clevis or other attachment loop on the spindle is center-balanced for improved controlled spinning.

20 Claims, 4 Drawing Sheets

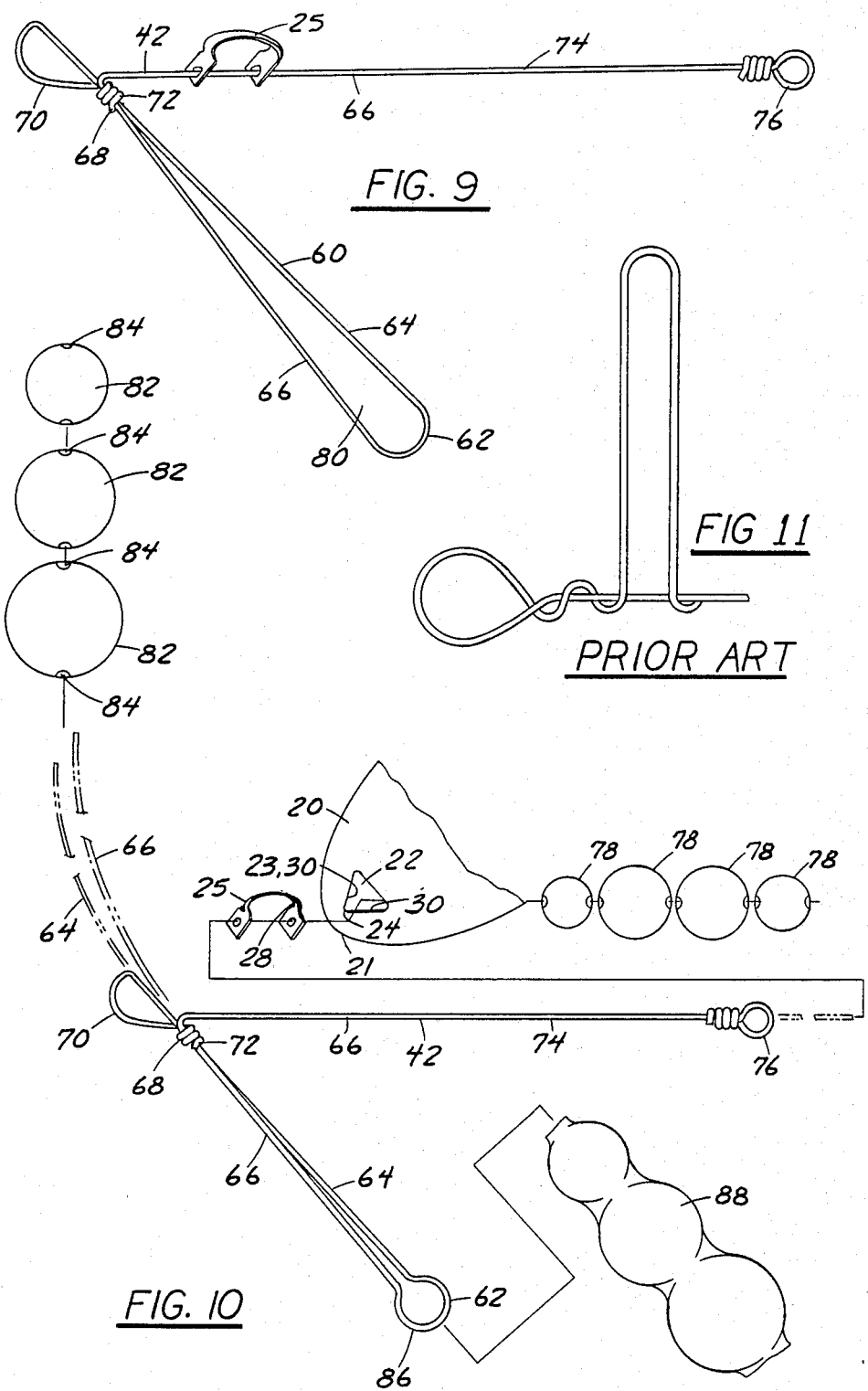

KEELED FISHING LURE APPARATUS

FIELD OF THE INVENTION

This invention is related generally to fishing lure apparatus and, more particularly, to keeled fishing lures of the type having spinners.

BACKGROUND OF THE INVENTION

A great variety of fishing lures of the prior art include spinners, that is, generally spoon-shaped devices which rotate on the lure, usually about a spindle extending along the principal lure axis. Such devices are usually referred to as "blades" or "spoons," but will be referred to herein as "spoons" or "spinner spoons."

In lures of this type, rotation of the spoon about the spindle as the lure is drawn through the water has a natural tendency to rotate the entire lure, causing twisting of the fishing line to which the lure is attached. This line twisting is very objectionable, especially when light monofilament line is used. Line twisting can become so severe that it can tangle the line on the reel holding such line, ruining any attempt to cast the lure.

Much effort has been expended to develop simple and effective ways to eliminate or reduce the line twist problem. Rotatable attachment of the spoon to the spindle by means of a U-shaped clevis reduces line twist problems to some extent by permitting the spoon to rotate more freely about the spindle than when other kinds of attachment loops or mechanisms are used. But frictional forces between the clevis and spindle are frequently still large enough to cause the entire lure to revolve and twist the line.

Because of the twisting problem, keels or vanes have been affixed to the spindle of the lure to prevent the spindle (and most of the lure apparatus) from rotating as the spoon rotates freely about it. A variety of keels have been used, including keels referred to as zero-point, one-point and two-point keels. Keels are made in a variety of ways, using a variety of materials, and with or without weights.

In a two-point keel, the spindle of the lure is attached to one point of the keel, which usually has a swivel, and the fishing line is attached to a second point. With one-point keels, the line and spindle are attached to the keel at the same point or the line is attached to the spindle with the keel attached to the body of the spindle. In a zero-point keel, the spindle is attached to the keel, but the fishing line is not connected to either the spindle or keel, but instead is attached to a wire which passes through the middle of the spindle.

Zero-point and two-point keels tend to be effective in eliminating the line twist problem, but they are undesirable because of a heaviness and bulkiness which reduce the ability of such lures to attract and catch fish. The small, streamlined design of one-point keels in many cases makes one-point keels the most desirable keel form for use in eliminating line twisting problems. The common single-wire construction of such one-point keels also makes them inexpensive. Such construction forms not only the keel, but also the line-attachment loop and the spindle, which of course supports the rotating clevis and spoon and most of the other elements of the fishing lure apparatus.

However, such one-point keels of the prior art have significant problems and drawbacks. Such prior one-point keels, an example of which is illustrated in FIG. 11, while structurally simple and inexpensive because of their use of a single wire, are structurally weak. They have a tendency to come apart, that is, to unravel when strains or forces are applied or when obstacles are encountered during fishing. The intended positional relationships of the keel and the spindle and of the keel and the line-attachment loop can tend to collapse during use, causing significant problems in operation and shortening the useful life of such devices.

Weight-forward lures with weighted keels are often desirable because they allow spinning while sinking in the water. However, many weight-forward lures of the prior art are particularly susceptible to entanglement of the line with the hook during casting. There is a need for an improved weight-forward lure minimizing such line entanglement problems. It would be desirable to have a simplified weight-forward lure, particularly one using a simple single-wire one-point keel.

There is a need for an improved keel construction for fishing lure—one with an improved keel configuration which, while simple in structure, would provide improved structural strength. An improved keeled fishing lure is needed which will provide improved resistance to line twist without disturbing the fish-catching qualities of the lure. A single-wire one-point keel which forms a strong structure and framework for a complete lure would be very useful. An improved keeled lure construction which operates well with a clevis and spinner spoon would be particularly desirable.

OBJECTS OF THE INVENTION

It is an object of this invention to provide an improved fishing lure apparatus overcoming some of the problems and shortcomings of the prior art.

Another object of this invention is to provide a fishing lure apparatus with an improved resistance to the line twisting.

Another object of this invention is to provide a fishing lure apparatus with a stronger one-point keel.

Another object of this invention is to provide a fishing lure apparatus with a simple single-wire keel, spindle and line-attachment loop configuration with improved strength and resistance to deformation.

Another object of this invention is to provide a fishing lure apparatus with improved stability of shape for improved reliability in its motion when drawn through the water.

Another object of this invention is to provide an improved weight-forward fishing lure apparatus which is simple and inexpensive in construction.

These and other important objects will be apparent from the descriptions of this invention which follow.

SUMMARY OF THE INVENTION

This invention is an improved fishing lure apparatus overcoming certain problems and shortcomings of prior keeled fishing lures, including those mentioned above. The invention is an improved one-point keel made of a single wire.

The fishing lure apparatus of this invention, as with certain fishing lures of the prior art, has line-attachment means and a principal axis about which a spinner spoon turns. The keels typically extend from a keel proximal end near the principal axis to a keel distal end, as with one-point keels of the prior art, but the configuration and construction are improved.

The keel of this invention is formed of a single wire doubled back on itself from the keel distal end to form first and second wire portions which are together at the keel proximal end, as with some other keels. However, the first wire portion extends from the keel proximal end to form a line-attachment loop and has a first end segment, returning from the line-attachment loop, which is wound around the first and second wire portions at the keel proximal end.

In certain preferred embodiments, the second wire portion extends from the keel proximal end along the principal axis, most preferably forming a spindle on which a spinner spoon is rotatably secured. A clevis is preferably secured to the spindle with the spinner spoon attached to the clevis. In some embodiments, the second wire portion extends farther to form a lure body mounting portion and terminates in a hook-attachment loop.

Certain highly preferred embodiments include weight means mounted on the keel. The weight means is preferably at least one weight and most preferably a plurality of weights. Such weights preferably have passageways through which the first and second wire portions are threaded to mount the weights. A shrink wrap is preferably tightly over the weights to hold them in place on the first and second wire portions of the keel.

In some embodiments, the second wire portion extends with the first wire portion from the keel proximal end to form a two-strand line-attachment loop. In such cases, the second wire portion has a second end segment returning from the line-attachment loop which is wound around the first and second wire portions at the keel proximal end.

In certain preferred embodiments in which the second wire portion forms a spindle to which a spinner spoon is rotatably attached, a particularly advantageous form of engagement is used to connect the spinner spoon for rotation about the spindle Such devices, as with other spinner spoon arrangements, include a spoon having a front end with a mounting hole near it. As with spoon-loop attachments in fishing lure apparatus of the prior art, the mounting hole has a leading edge portion with a centerpoint toward the front end of the spoon. A substantially rigid attachment loop, preferably a clevis rotatably secured to the spindle, extends loosely through the mounting hole and has an inner edge with a spoon-engagement portion The spoon is pulled through the water by sole means of the attachment loop, and the spoon vibrates and flutters on the loop as this occurs. The attachment loop (clevis) is rotatable which allows the spoon to spin through the water.

The particular advantage of such highly preferred embodiments is based in part on recognition that the characteristics of the vibration and flutter of the spoon as it moves through the water are affected by the relationship of the mounting hole and attachment loop. As the apparatus is pulled through the water, the leading edge portion of the mounting hole in the spoon and the spoon-engagement portion of the attachment loop inner edge are, of course, the primary contact portions of the spoon and loop.

Such highly preferred embodiments have non-circular means on at least one of such primary contact portions to focus the engagement of the leading edge portion of the mounting hole and the spoon-engagement portion of attachment loop toward the centerpoint of such leading edge as the lure apparatus is drawn through water. Such "center-balanced" mount provides significant advantages.

The non-circular focusing means may take a variety of forms, but serves to substantially limit and control the lateral range of flutter and vibration. A tighter and stronger spinning occurs, with a stronger thump. Such stronger, more regular, and less erratic fluttering action is believed to more closely simulate the motion of natural baits.

As noted, the focusing means may take a variety of forms. In preferred forms, the focusing means includes a non-circular irregularity of the mounting hole substantially centered at the centerpoint of the leading edge. Many different mounting hole shapes function successfully. In one embodiment, the leading edge portion of the mounting hole in the spoon is deltoid in shape. In another, the leading edge portion is ovate with the point of shortest radius substantially centered at the centerpoint of the leading edge. In still another, the leading edge portion is cordate, that is, is shaped like the narrower lower portion of the symmetrical heart symbol. The leading edge portion preferably forms an acute angle. In certain preferred forms, including many of those already described, the aforementioned irregularity includes the leading edge portion having a pair of edge portions which converge to a corner, either sharp or blunt, at the leading edge portion centerpoint.

In some cases, the mounting hole has a substantially circular major portion and a minor portion which projects from the major portion in a direction toward the front end of the spoon, with the leading edge portion being along the mounting hole minor portion. A variety of shapes can be used for the such minor portion.

In some preferred embodiments, the rigid attachment loop is a clevis which has an edge with a pair of spaced edgepoints in contact with the leading edge portion of the mounting hole. The non-circular irregularity of the mounting hole is such that lines tangent to the mounting hole at the two edgepoints form an angle less than about 160° degrees.

In one form, the focusing means is a gap in the leading edge extending to the front end of the spoon. Such gap is narrower than the attachment loop, allowing the spoon to stay on the loop, but still serves to locate and focus the engagement of the loop and mounting hole to provide the advantages of center-balanced mounting.

The improved keeled fishing lure apparatus of this invention provides substantial advantages over devices of the prior art, achieving the objects stated above.

BRIEF DESCRIPTION OF THE DRAWINGS

FIG. 9 is an enlarged perspective view of the wire keel-spindle construction of FIG. 1, with other parts of the fishing lure apparatus, except the clevis, removed for clarity of illustration.

FIG. 10 is an exploded side elevation of another complete fishing lure apparatus in accordance with this invention, including a weighted keel and preferred spinner spoon.

FIG. 11 is an enlarged fragmentary side elevation of a wire keel construction in accordance with the prior art.

DETAILED DESCRIPTIONS OF PREFERRED EMBODIMENTS

Figure 1:
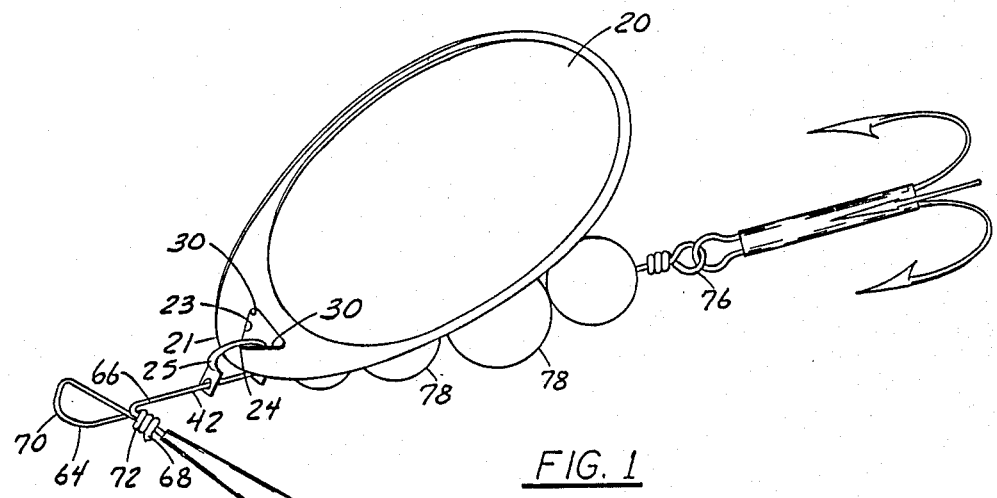
FIG. 1 is a perspective view of a preferred fishing lure apparatus in accordance with this invention.
Figures 2, 3:
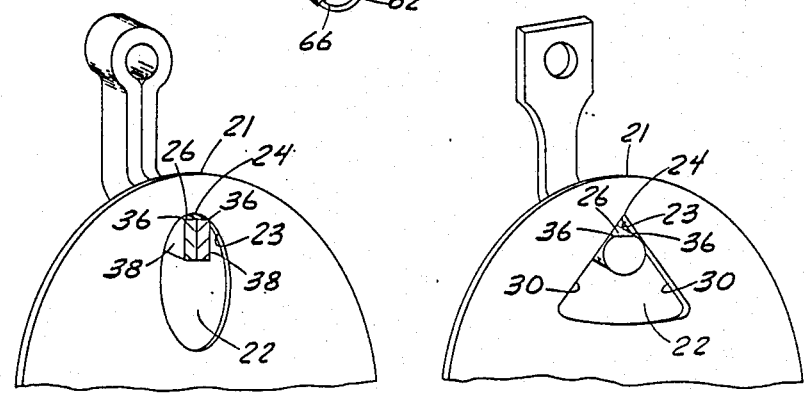
FIG. 2 is an enlarged fragmentary perspective view of the spoon and clevis of FIG. 1.
FIGS. 3-7 are similar perspective views of other preferred spoon-clevis combinations.
Figure 12:
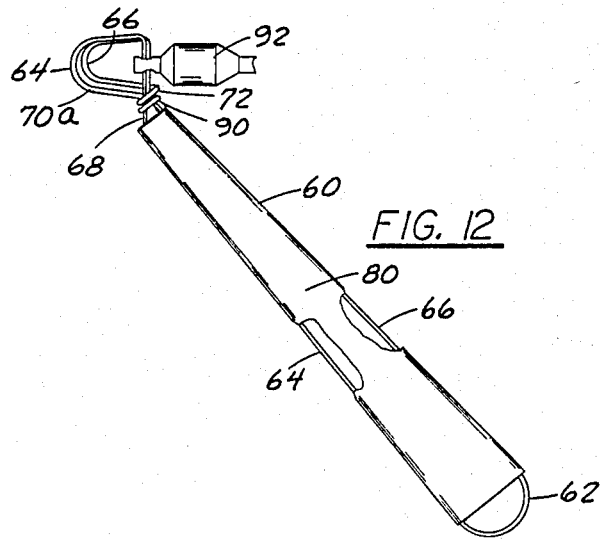
FIG. 12 is a side elevation of a variation of the improved keel construction.

The figures illustrate several embodiments of the fishing lure apparatus of this invention. FIGS. 1 and 10 show complete fishing lures, each including a unique wire keel-spindle construction and a unique spoon-clevis interengagement. FIGS. 2-8B illustrate variations of the unique spoon-clevis interengagement. FIG. 9 shows more detail on the keel-spindle construction, and FIGURE 12 shows a variation in the unique keel construction. Throughout the drawings, similar elements and parts are identified by the same numerals.

Each spoon 20 has a front end 21 and a mounting hole 22 adjacent thereto. Mounting hole 22 has a leading edge portion 23 and leading edge centerpoint 24 both toward front end 21. Spoons 20 are each mounted on a generally rigid attachment loop which in each case is a clevis 25. Each clevis 25 extends loosely through mounting hole 22 of spoon 20 and has an inner edge 26 which includes a spoon-engagement portion 28. Mounting holes 22 and their leading edges 23 of the several spoons 20 vary and will hereafter be described.

In each case, leading edge 23 is engaged by spoon-engagement portion 28 of inner edge 26 of clevis 25 while the fishing lure apparatus is pulled through the water as in trolling and in casting. Spoon-engagement portion 28 and leading edge portions 23 form primary contact portions of clevis 25 and spoon 20. In each case, non-circular means are included on at least one of the primary contact portions to focus clevis-spoon engagement on centerpoint 24 of mounting hole leading edge portion 23. The focusing means is a non-circular irregularity of mounting hole 22 substantially centered on centerpoint 24 of mounting hole leading edge 23.

Figure 4:
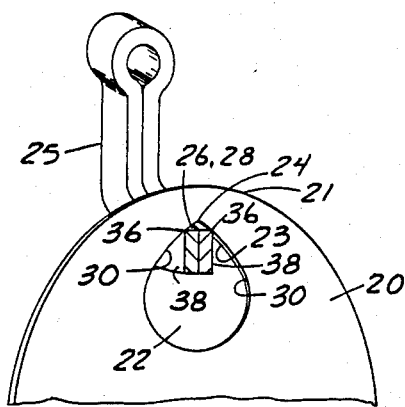
Figure 6:
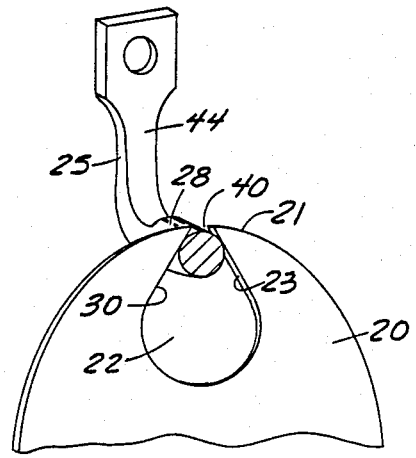
Figure 7:
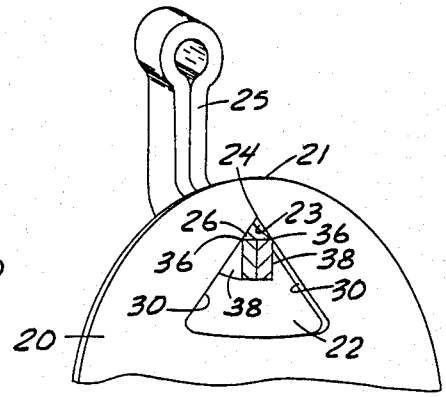

In FIGS. 1, 2, 7 and 10, and in FIGS. 4 and 6 as well, leading edge portion 23 is deltoid in shape. Each such leading edge portions tends to focus the engagement of spoon-engagement portion 28 at centerpoint 24 and resists easy lateral movement of clevis 25 away from center at centerpoint 24. As with the deltoid leading edge portions the leading edge portion tends to focus spoon-engagement portion 28 at centerpoint 24. Leading edge portion 23 of spoon mounting hole 22 in FIG. 4 is cordate in shape, that is, shaped like the point end of the heart symbol. The focusing of spoon-engagement portion 28 in such cordate leading edge is apparent.

Each deltoid leading edge portion described above forms an acute angle to serve as means to focus the engagement of clevis 25 in mounting hole 22. Such acute angles are one highly preferred focusing means. The obtuse angling shown in the embodiment of FIG. 4 is also acceptable.

Leading edge portions 23 of spoons 20 in FIGS. 1-2, 4, 7 and 10 each have a pair of edge portions 30 which converge to a corner at centerpoint 24. In contrast, the mounting hole illustrated in FIG. 3 has a curved leading edge without any corner formation. Each form serves to focus the engagement of spoon and clevis and provide the necessary center-balancing which is missing from structures of the prior art.

Figure 5:
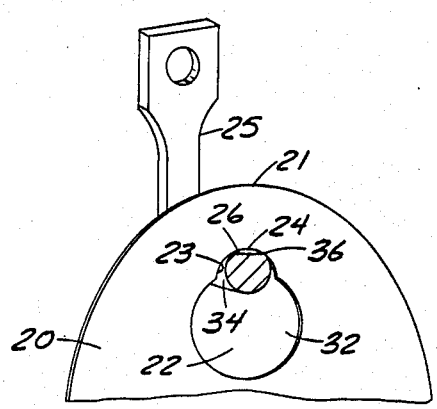

Mounting hole 22 in the spoon illustrated in FIG. 5 includes a circular major portion 32 and a minor portion 34 projecting from major portion 32 in a direction toward front end 21 of spoon 20. Leading edge portion 23 is along minor portion 34 of mounting hole 22. Minor portion 24 captures and positions spoon-engagement portion 28 of clevis inner edge 26 and tends to keep it focused at centerpoint 24.

As illustrated in FIGS. 2-5, and 7-8B, inner edge 26 of clevis 25 has a pair of edgepoints 36 in contact with leading edge portion 23 of mounting hole 22. The non-circular irregularity of mounting holes 22 in these embodiments is such that lines which are tangent to mounting hole 22 at edgepoints 36 form an angle less than about 160 degrees. Such angling serves to provide sufficient focus of spoon-engagement portion 28 of clevis 25 toward centerpoint 24 to serve the purposes of this invention.

In FIGS. 3, 4, 7, 8A and 8B, each clevis is planar, having opposed first and second planar surfaces 38. Inner edge 26 of each such clevis is substantially straight in cross-section with edgepoints 36 being formed at the intersection of inner edge 26 and planar surfaces 38. In contrast, the clevis shown in FIGS. 2 and 5 is circular in cross-section with a flattened inner edge 26.

Figure 8A:
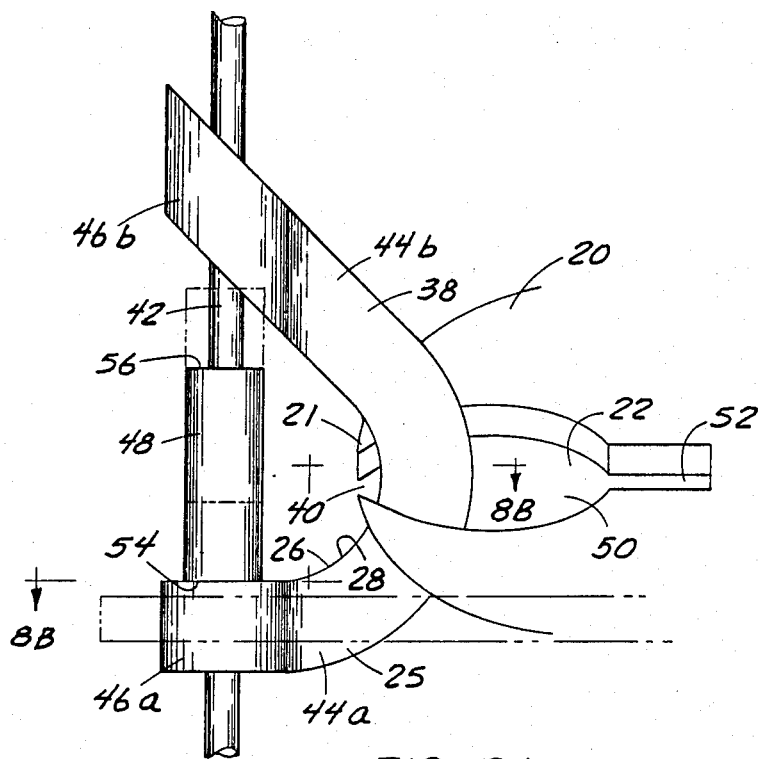
FIG. 8A is a greatly enlarged side elevation of another preferred spoon-and-clevis arrangement.
Figure 8B:
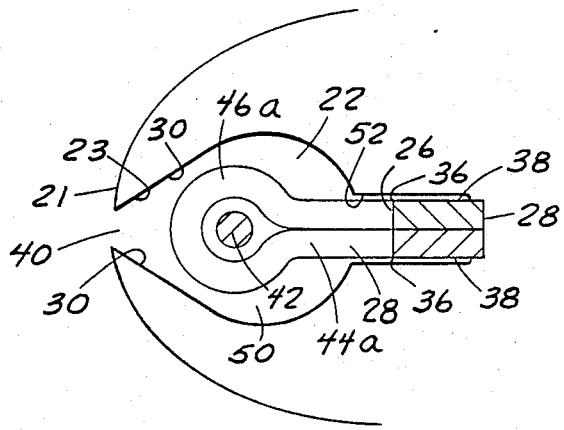
FIG. 8B is a top sectional view of the device of FIG. 8A, taken along section 8B—8B, with the restrictor tube raised and the spoon moved to a lower, laterally offset position for disconnection from the clevis.

The spoons shown in FIGS. 6, 8A and 8B have gaps 40 in their leading edges 23. Gaps 40 extend from leading edge 23 to front end 21. In each case, gap 40 is narrower than the clevis extending through mounting hole 22. Gaps 40 serve as means for focusing the engagement of spoon-engagement portion 28 at leading edge centerpoint 24. This dimensioning keeps spoon 20 from disconnecting from clevis 25 as the fishing lure apparatus is pulled through the water.

In each of the embodiments of FIGS. 6, 8A and 8B, the spindle 42, formed of wire, is narrower than gap 40. This allows disconnection of spoon 20 from clevis 25 to begin by moving it off the open end of clevis 25 until gap 40 passes over spindle 42. The remainder of the disconnection will be described after a more detailed description of the clevis structure.

Each clevis 25 illustrated in the drawings has first and second leg portions 44 with terminal structures 46 at their ends. Terminal structures 46 are each pivotably attached to spindle 42 such that the spoon-clevis combinations can spin around spindle 42. In the devices of FIGS. 6, 8A and 8B, terminal structures 46 are small enough to pass through mounting holes 22 in spoons 20. This allows disconnection of spoon 20 from clevis 25 to be completed, by moving spoon 20 beyond clevis 25 and from there over spindle 42 again to a position remote from the remainder of the apparatus.

The connection of each gapped spoon 20 with its clevis 25, in the embodiments of FIGS. 6, 8A and 8B, is carried out by reversing the disconnection operations just described. There is no need for tools for connection or disconnection. Thus, the spoons can readily be replaced with other gapped spoons.

FIGS. 8A and 8B are designed to avoid inadvertent disconnection of a spoon from its clevis. A restrictor tube 48 is around spindle 42 between terminal structures 46. Restrictor tube 48 is wider than gap 40 such that it blocks inadvertent disconnection of spoon 20. But tube 48 is shorter than the length of spindle between terminal structures 46 such that it can intentionally be slid on the spindle to a position exposing enough of spindle 42 to allow gap 40 to reach and pass over spindle 42.

Mounting hole 22 in the embodiment of FIGS. 8A and 8B includes a main portion 50 and a notch 52 extending from it opposite gap 40. Notch 52 is sized to receive a portion of clevis 25 in order that gap 40 may reach and pass over and exposed portion of spindle 42.

In the device of FIGS. 8A and 8B, restrictor tube 48 has first and second ends 54 and 56 which are adjacent to terminal structures 46a and 46b of first and second clevis leg portions 44a and 44b, respectively. The engagement of tube first end 54 with its adjacent terminal structure 46a is such that during such engagement there is insufficient clearance between tube second end 56 and its adjacent terminal structure 46b to allow spoon front end 21 and its gap 40 to reach spindle 42 for disconnection. However, the engagement of tube second end 56 with its adjacent terminal structure 46b is such that during such engagement there is sufficient clearance between tube first end 54 and its adjacent terminal structure 46a to allow spoon front end 21 and its gap 40 to reach spindle 42 for disconnection.

Such differing engagement characteristics of restrictor tube ends and terminal structures may be accomplished in various ways. In one preferred form, second leg portion 44b of clevis 25 is angled away from first leg portion 44a. This readily allows the engagement of tube second end 56 and its adjacent terminal structure 46b to be recessed, which in turn creates sufficient space for spoon removal just below tube first end 54.

FIGS. 1, 9, 10 and 12 illustrate a unique wire keel construction providing significant advantages over the prior art. While keels for fishing lure apparatus have been made of single wires in the past, the fabrication has typically been as illustrated in FIG. 11, which represents the prior art. The single wire keels of FIGS. 1, 9, 10 and 12 are completely different in configuration and construction.

In each of the devices illustrated in FIGS. 1, 9, 10 and 12, a keel 60 is formed by a unique single-wire configuration. The configurations of FIGS. 1, 9 and 10 will be described first, and then the variations in the configuration of FIG. 12 will be described.

Keel 60 is formed of a single wire doubled back on itself from a keel distal end 62 which divides the wire in first and second wire portions 64 and 66. First and second wire portions 64 and 66 are together at a keel proximal end 68 which is at the principal axis formed by spindle 42. First wire portion 64, which may be on either side of the keel, extends from keel proximal end 68 to form a line-attachment loop 70 at the end of spindle 42. Loop 70, of course, is used for attachment of fishing line. First wire portion 64 has a first end segment 72 returning from line-attachment loop 70. Such first end segment 72 is wound tightly, preferably with several turns, around first and second wire portions 64 and 66 at keel proximal end 68. This serves to support all portions of the single-wire configuration, including keel 60, firmly in their relative positions and prevent unraveling or distortion even during application of force as in fishing.

In the embodiments of FIGS. 1, 9 and 10, second wire portion 66 extends from keel proximal end 68 to form spindle 42, which defines and runs substantially straight along the principal axis of the lure. As illustrated in FIGS. 1, 9 and 10, clevis 25 is rotatably secured to spindle 42 for rotatable attachment of a spinner spoon 20 with respect to spindle 42. Second wire portion 66 extends further to provide a lure body mounting portion 74 and finally terminates in a hook-attachment loop 76.

As shown in FIGS. 1 and 10, body beads 78 may be threaded onto or otherwise attached to lure body mounting portion 74 of second wire portion 66, preferably at a position just behind clevis 25. The nature of such body beads or other body elements need not be described here since they form no part of this invention. Such parts, however, are typically chosen for their fish-attracting qualities.

The keel shown in FIG. 1, in addition to being formed of first and second wire portions 64 and 66 as described, has a plastic-sheet wrap around such wire portions to form a keel wall 80. This allows such keel to perform its function of avoiding or minimizing line twist problems.

The keel shown in FIG. 10 is a weighted keel, having three weights 82 which are brass beads or the like with passageways 84 through them. First and second wire portions 64 and 66 are both threaded through passageways 84 until they are drawn against a distal end loop 86, which is a part of the wire. A plastic shrink-wrap 88 covers weights 82 and holds them in place on first and second wire portions 64 and 66 and to complete formation of the keel. FIG. 10 also illustrates first and second wire portions 64 and 66 in phantom lines, as they would be before completion of the wire keel and spindle structure, in position for threading of weights 82 thereon.

FIG. 12 illustrates a variation of the improved single wire keel. In this device, second wire portion 66 extends with first wire portion 64 from keel proximal end 68 to form, with first wire portion 64, a two-strand line-attachment loop 70a. Second wire portion 66 has a second end segment 90 like first end segment 72 of first wire portion 64, which upon returning from loop 70a is wound with first end segment 72 around first and second wire portions 64 and 66 at keel proximal end 68.

In the configuration of FIG. 12, no spindle is formed. Instead, a standard swivel bearing 82 is attached to two-strand line-attachment loop 70a. The swivel bearing can be attached loosely as shown in the diagram or soldered to loop 70a, forming a rigid attachment. A rigid attachment loop can extend through swivel bearing 92 and be used for rotatable mounting of a spoon, preferably spoons of the type shown in the drawings.

The fishing lure apparatus described herein can be made using readily available parts and materials. Acceptable parts and materials would be apparent to those skilled in the art who become familiar with this invention. A preferred wire used for the keel and lure construction is a stainless steel spring wire with diameter of about 0.024 inch. Variations are possible, particularly for lures of particularly small or large size. A great many changes may be made in several of the parts and elements described herein.

While the principles of this invention have been described in connection with specific embodiments, it should be understood clearly that these descriptions are made only by way of example and are not intended to limit the scope of the invention.

I claim:

1. In fishing lure apparatus of the type having line attachment means, a principal axis, and a keel extending from a keel proximal end near such axis to a keel distal end, the improvement wherein:

the keel is formed of a wire doubled back on itself from the keel distal end into first and second wire portions which are together at the keel proximal end; and the first wire portion extends from said keel proximal end to form a line-attachment loop and has a first end segment returning from the line-attachment loop which is wound around the first and second wire portions at the keel proximal end.

2. The fishing lure apparatus of claim 1 wherein the second wire portion extends from the keel proximal end along the principal axis.

3. The fishing lure apparatus of claim 2 wherein:
the second wire portion forms a spindle; and
a spinner spoon is rotatably secured with respect to the spindle.

4. The fishing lure apparatus of claim 3 wherein a clevis is secured to the spindle and the spinner spoon is attached to the clevis.

5. The fishing lure apparatus of claim 3 comprising:
the spoon having a front end and a mounting hole with a leading edge portion and leading edge centerpoint toward the front end;
a substantially rigid attachment loop rotatably secured with respect to the spindle, extending loosely through the mounting hole, and having an inner edge with a spoon-engagement portion, the leading edge and spoon-engagement portions being primary contact portions of the spoon and loop; and
non-circular means on at least one of said primary contact portions to focus engagement toward the centerpoint of the leading edge portion as the lure apparatus is drawn through water.

6. The fishing lure apparatus of claim 5 wherein the focusing means comprises a non-circular irregularity of the mounting hole substantially centered at the centerpoint of the leading edge.

7. The fishing lure apparatus of claim 6 wherein the leading edge portion is deltoid.

8. The fishing lure apparatus of claim 6 wherein the leading edge portion is ovate with the point of shortest radius substantially centered at the centerpoint of the leading edge.

9. The fishing lure apparatus of claim 6 wherein the leading edge portion is cordate.

10. The fishing lure apparatus of claim 6 wherein the leading edge portion forms an acute angle.

11. The fishing lure apparatus of claim 6 wherein the non-circular irregularity comprises the leading edge portion having a pair of edge portions converging to a corner at the leading edge portion centerpoint.

12. The fishing lure apparatus of claim 6 wherein the mounting hole has a substantially circular major portion and a minor portion projecting therefrom in a direction toward the front end of the spoon, said leading edge portion being along the mounting hole minor portion.

13. The fishing lure apparatus of claim 6 wherein:
the attachment loop is a clevis having an inner edge with a pair of edgepoints in contact with the leading edge portion of the mounting hole; and
the non-circular irregularity of the mounting hole is such that lines tangent to the mounting hole at the edgepoints form an angle less than about 160 degrees.

14. The fishing lure apparatus of claim 6 wherein the focusing means is a gap in the leading edge extending to the front end of the spoon, said gap being narrower than the attachment loop.

15. The fishing lure apparatus of claim 3 wherein the second wire portion extends to form a lure body mounting portion and terminates in a hook-attachment loop.

16. The fishing lure apparatus of claim 1 further including weight means mounted on the keel.

17. The fishing lure apparatus of claim 16 wherein the weight means comprises at least one weight having a passageway therethrough and the first and second wire portions extend through the passageway.

18. The fishing lure apparatus of claim 17 further comprising shrink wrap tightly holding the weight means in place on the first and second wire portions of the keel.

19. The fishing lure apparatus of claim 17 wherein:
the second wire portion extends from the keel proximal end along the principal axis to form a spindle; and
a spinner spoon is rotatably secured with respect to the spindle.

20. The fishing lure apparatus of claim 1 wherein the second wire portion extends with the first wire portion from said keel proximal end to form, with the first wire portion, a two-strand line-attachment loop, said second wire portion having a second end segment returning from the line-attachment loop and wound around the first and second wire portions at the keel proximal end.

* * * * *